Aug. 1, 1961   R. R. PECORARO ET AL   2,994,760
OVENS

Filed Jan. 29, 1959   5 Sheets-Sheet 1

INVENTOR.
RALPH R. PECORARO
EDWARD J. DZIEDZIULA
BY
Jerome Bauer
ATTORNEY.

Aug. 1, 1961   R. R. PECORARO ET AL   2,994,760
OVENS
Filed Jan. 29, 1959   5 Sheets-Sheet 2

INVENTOR.
RALPH R. PECORARO
EDWARD J. DZIEDZIULA
BY
Jerome Bauer
ATTORNEY.

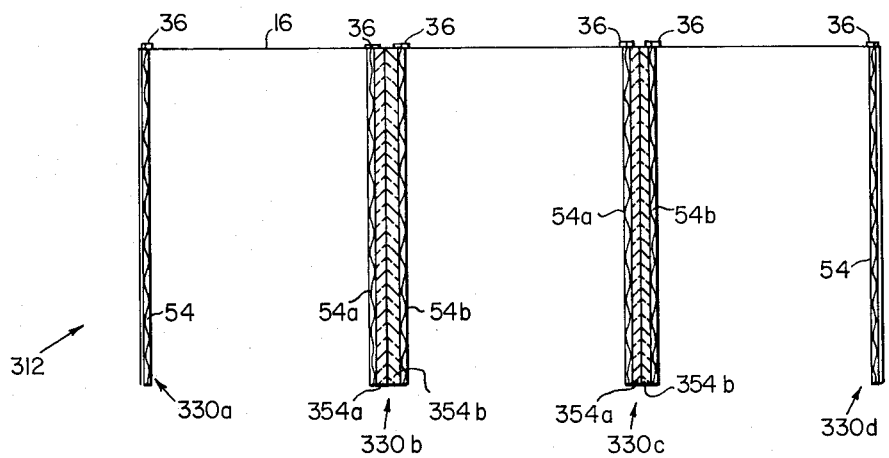
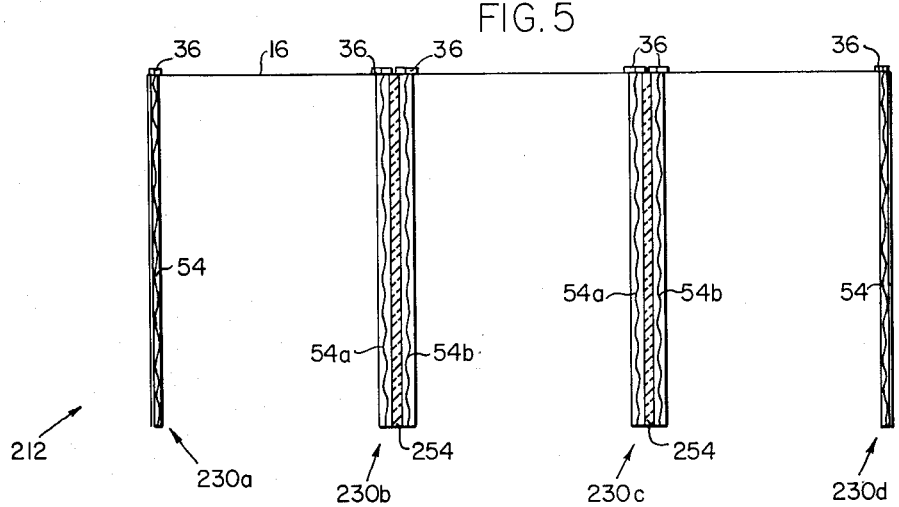
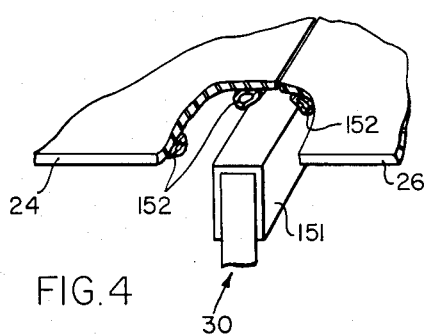

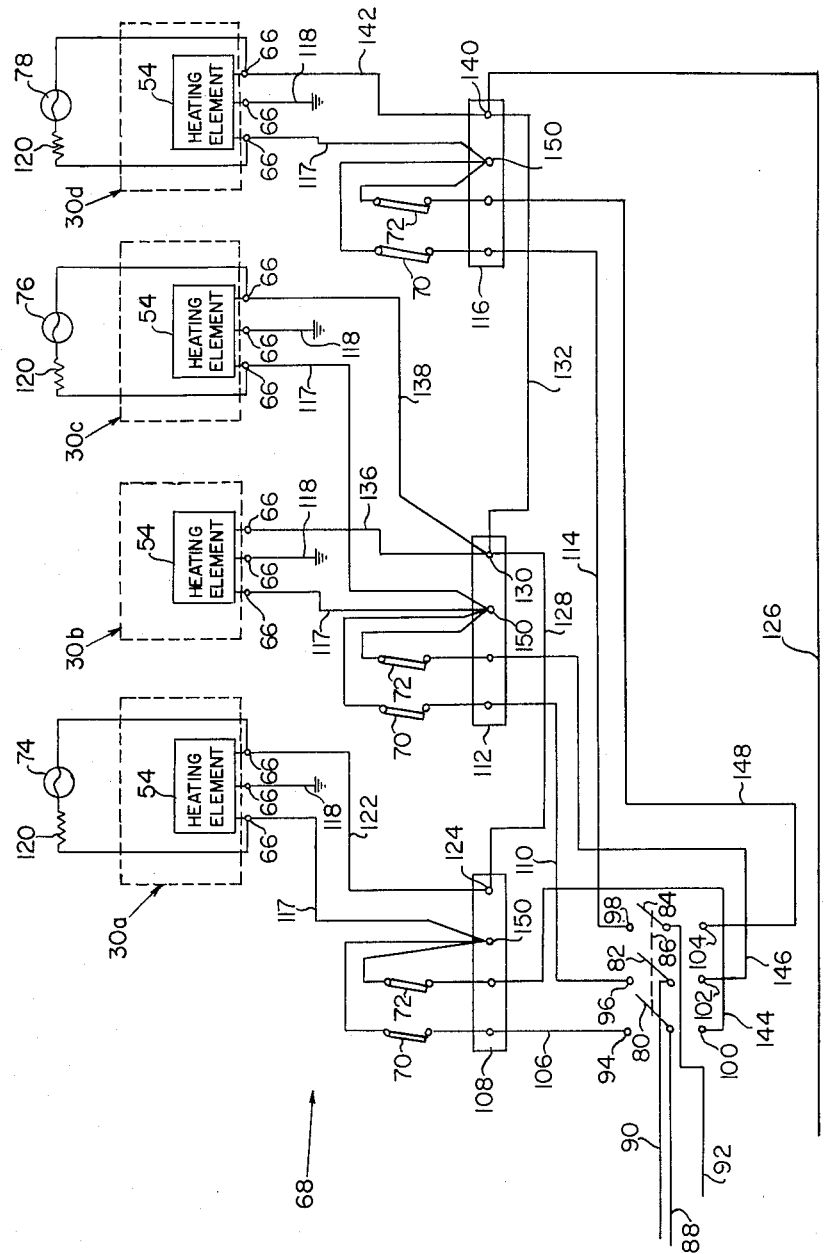

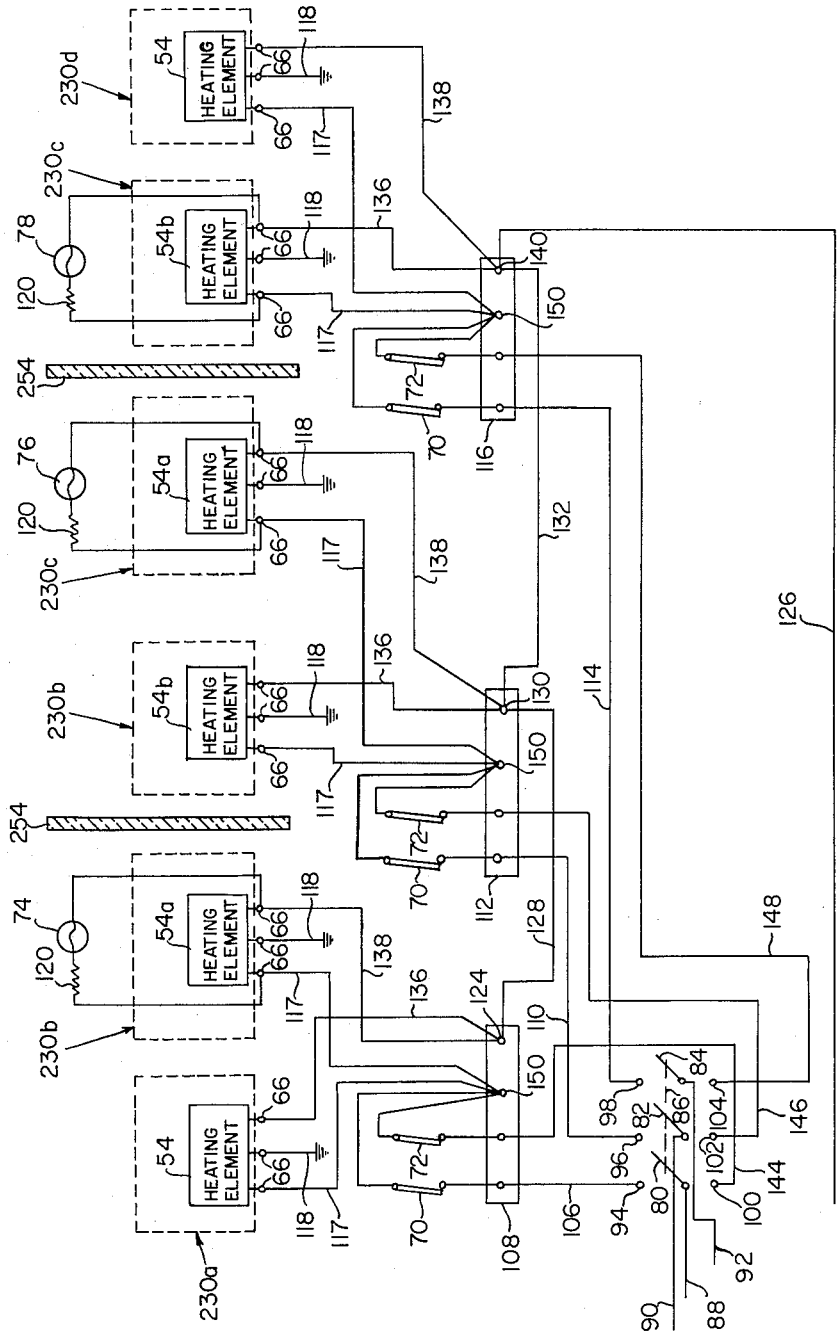

United States Patent Office 2,994,760
Patented Aug. 1, 1961

2,994,760
OVENS
Ralph R. Pecoraro, West Islip, and Edward J. Dziedziula, North Massapequa, N.Y., assignors to Ref Manufacturing Corporation, Mineola, N.Y., a corporation of New York
Filed Jan. 29, 1959, Ser. No. 789,864
10 Claims. (Cl. 219—35)

This invention relates to ovens. More particularly the invention relates to ovens that form an integral part of an aircraft galley of the type disclosed in the copending application of David L. Paulding, Serial No. 579,525, filed April 20, 1956, now Serial No. 2,855,526, granted May 5, 1959.

The desideratum of this invention is to provide an oven having an interior compartment adapted to be divided into smaller compartments, each of which may be selectively and controllably heated to a predetermined temperature.

Another object of the invention is to provide an oven that may be divided into smaller compartments, each of which may have an even distribution of heat therethroughout and within a selected range of temperature, and which range of temperature may be predeterminately controlled. Accordingly, features of the invention reside in the provision of removable panels having heating means regulated by temperature control devices.

A further object of the invention is to provide an electric oven with a novel arrangement of electrical circuitry of which the panel, its heating means, and the temperature control devices form an operative part.

Other and further objects of our invention reside in the structures and arrangements hereinafter more fully described with reference to the accompanying drawings in which:

FIG. 4 is a partial sectional view showing the cooperation of portions of the oven doors with a portion of a heating panel positioned therebetween.

FIG. 5 is a top section of the oven showing a modified form of heating panel means.

FIG. 6 is a top section of the oven showing a further modification of the heating panel means.

FIG. 7 is a diagrammatic view showing the electrical circuit of the oven, and

FIG. 8 is a diagrammatic view showing a modified electrical circuit for the oven.

Figure 1:
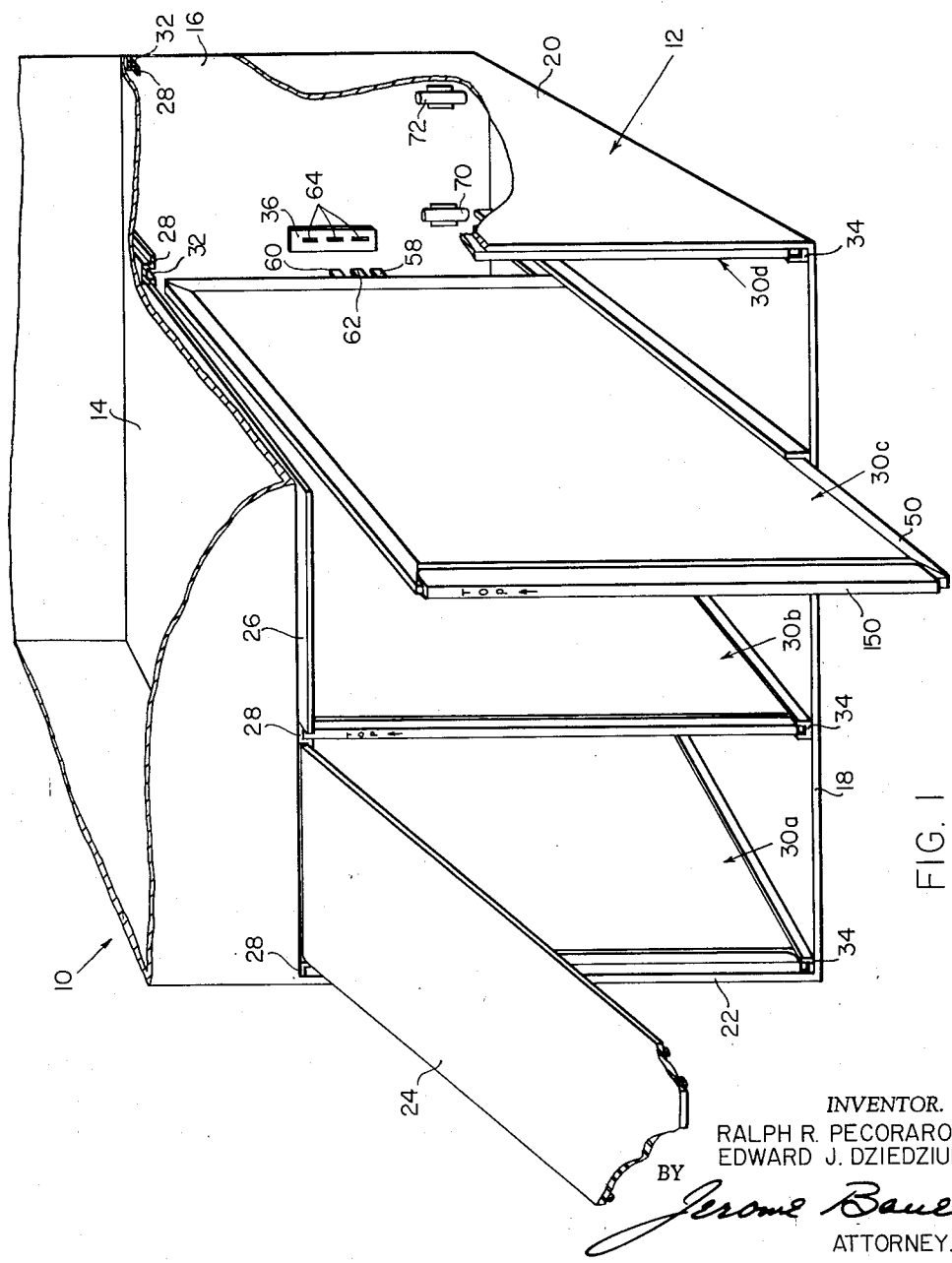
FIG. 1 is a perspective view of the oven constructed in accordance with the teaching of the invention and depicted as an integral part of a galley, only a portion of which is shown.

Referring now to the drawings and in particular to FIG. 1 thereof, there is disclosed a cut-away portion of a galley of the type employed in aircraft and generally identified by the numeral 10. The galley 10 includes the oven formed as an integral part thereof and identified by the numeral 12.

Oven 12 has a top 14, a rear wall 16, a bottom 18 and opposite sides 20 and 22. An interior compartment (not numbered) of the oven is bounded by the above mentioned walls and sides. Access to such overall oven compartment is afforded by a plurality of separately operable doors of which only two, 24 and 26, are shown in FIG. 1. The access doors shown and described are for illustration purposes only. The number and size of the doors may be varied without departing from the concept of the invention.

The doors 24 and 26 are guided for sliding movement into an active open position along flanges of tracks 28 positioned on their opposite sides and secured to the underside of the top 14. In FIG. 1, the door 26 is shown in its completely open position, withdrawn and housed beneath the top 14. Door 24 illustrates its partially closed position as it is guided outward from beneath the top 14 to close over one section of the oven compartment.

Figure 2:
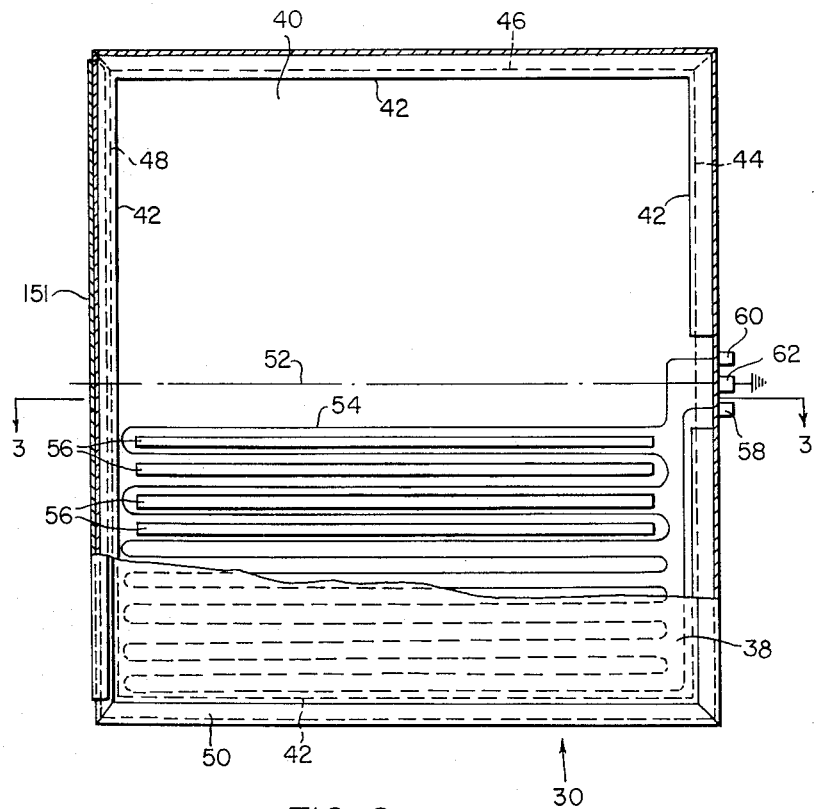
FIG. 2 is a cross section of a heating panel as taken along lines 2—2 of FIG. 3.
Figure 3:
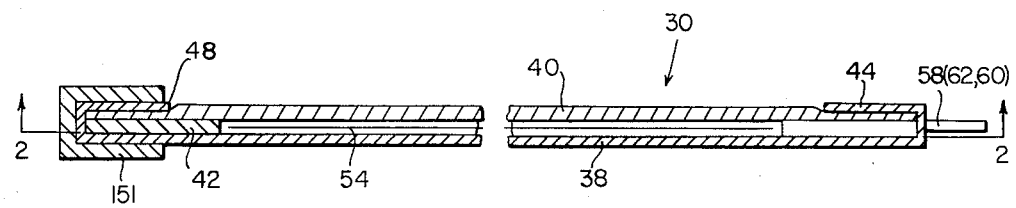
FIG. 3 is an enlarged section of FIG. 2 taken along lines 3—3.

The overall interior compartment of the oven 12 is capable of being selectively divided into completely separate and isolated smaller compartments by panel means generally identified by the numeral 30 (FIGS. 2 and 3). Because the panel means 30 include heating elements to be described, at times the same are referred to hereinafter as "heating panels." Panels 30 are adapted to be manually inserted and withdrawn from the interior compartment of the oven. To facilitate this, they are guided for movement at their upper ends by guideways 32 formed in the upper tracks 28 while their lower ends are guided in the tracks 34. Each upper track 28 is vertically aligned with a corresponding lower track 34 to accurately position the panel 30 for alignment and subsequent engagement with an electrical conductor outlet 36, of any well known design, fixed in the rear wall 16.

FIGS. 2 and 3 of the drawings show the simplified details of the heating panel 30. Panel 30 comprises spaced side plates 38 and 40 which, for reference purposes, are termed front and back plates respectively. The plates 38 and 40 are retained in spaced relationship by a frame 42 extending fully about the interior periphery of the panel and held in place by the mitered-fitting marginal edges 44, 46, 48 and 50 of the front plate 38 that are bent tightly over corresponding portions of the back plate 40.

The back plate 40 is narrowed slightly along its marginal portions to accommodate the edges 44 to 50 of the front plate 38 so that the bent edges of the front plate are in substantial planar alignment with the raised outer surface of the back plate. The resulting panel is extremely thin and substantially uninterrupted along both its front and back planar sides. The cooperation of the bent marginal edges 44 to 50 with the narrowed marginal edges and raised portions of the back plate 40 as shown in FIG. 3, eliminates the possibility of accumulation of food and dirt along the sides or corners thereof.

To aid in the explanation it might be said that the interior space of the panel 30 as bounded by the inner walls of the frame 42 is arbitrarily divided into two longitudinally coextensive half portions defined on opposite sides of an imaginary centerline 52. In the past, it has been a problem in ovens of the present kind to maintain an even heat throughout the compartments thereof because the heat rises rapidly from the bottom of the compartment to the top. This problem is corrected by the novel panel 30 that is provided with a wire heating element 54 that extends from the front to the rear or for the full width of the interior space of the panel. The heating ability of the element 54 is concentrated in the lower portion of the panel to provide its greatest concentration of heat in the area of the oven compartment that has a tendency to lose its heat rapidly as the same rises toward the top of the compartment.

To insure a greater concentration of heat in the lower portion of the oven compartment, the heating element 54, positioned within the lower half portion of the interior space of the panel 30, terminates at a point lower than the centerline 52. In referring to FIG. 2, it will be seen that the single heating wire 54 is defined into two distinct parts of windings or turns. The lower part of the heating element is wound to form a plurality of longitudinally closely spaced turns positioned in the lower part of the lower portion of the interior space of the panel. The upper part of the heating element 54 is closely wound to form a plurality of turns that are spaced longitudinally wider or farther apart than the lower part turns.

By spacing each of the upper part turns substantially equal to twice the distance of the spacing of the lower part turns, the heat produced thereby will be half the amount produced by the lower part turns. Accordingly, the greatest concentration of heat will be in the lowermost portion of the compartment. As this heat rises it has a tendency to cool, thereby creating an uneven heating in the compartment. However, as this greatest concentration of heat rises in the compartment it comingles with the lesser concentration of heat produced by an upper part turns and is immediately restored to its proper temperature.

The resultant heat that rises and accumulates at the upper or top portion of the oven compartment, wherein no heating elements are positioned, is the same or substantially the same as that produced at the lowermost part of the compartment. Hence, it has been found in practice, that by applying the greatest concentration of heat in the lowermost portion of the compartment and commingling this rising cooling heat with a lesser heating factor, a more even range of heat is produced throughout the compartment.

The longitudinally wider spaced upper part turns of element 54 are retained in their spaced relationship by spacers 56 of Fiberglas material. The spacers 56 are positioned between the wider spaced turns to prevent the same from moving relative to each other and thereby serve to secure the same in place within the interior space of the panel. Each end of the series wound heating element 54 terminates at a plugged connector 58 and 60 while the panel 30 is provided with ground plug connector 62.

The shape and relative spacing of the connectors 58, 60 and 62 coincides with the shape and relative spacing of their receiving openings 64 (FIG. 1) of outlet 36 fixed to the rear wall 16 of the oven. Thus, when the panel 30 is manually moved into the compartment of the oven 12 and guided along the upper and lower tracks 28 and 34 it divides the same into a plurality of completely separated smaller compartments. When fully in position in the oven compartment, it becomes a dividing wall of the adjacent smaller compartments to which it applies its heat. As the panel is moved into the oven compartment along the upper and lower guiding tracks its plug connectors 58, 60 and 62 are automatically guided into cooperating electrical engagement with a set of electrical contacts 66 forming a part of the outlet structure 36.

Referring to FIG. 1, it will be seen that the oven 12 includes four of the panels 30 more fully detailed in FIGS. 2 and 3. FIG. 7 is a diagrammatic arrangement of the electrical circuit, generally identified by the numeral 68, into which the heating elements 54 of the panels 30 are adapted to be connected and to become an operative working part. To more fully understand the operation of circuit 68 and the correlation of the many panel means shown in FIG. 1, the same are singularly identified in FIGS. 1 and 7 by the addition of suffix letters *a, b, c* and *d*.

In FIG. 7 the electrical circuit 68 includes a plurality of temperature range control means or thermostats 70 and 72 that are positioned in each of the divided smaller compartments of the oven. When the oven 12 is utilized in the normal aircraft galley only two ranges of temperature are normally required. A low range of temperature is generally utilized to keep warm food that has already been cooked, while a high range of temperature may be necessary to reconstitute partly cooked or uncooked foods stored in the oven. The smaller oven compartments are provided with a control means 70 adapted to control the heating element or elements connected in circuit therewith for a predetermined low range of temperature operation, while the control means 72 is adapted to control the heating element or elements connected in circuit therewith for a predetermined high range of temperature operation.

The control means 70 and 72 are commercially available devices. Their ranges of temperature control may be preselected by proper adjustment of certain structural elements thereof. The details of the control means form no part of this invention. However, the inventive disclosure is not limited to the use of the distinct control means 70 and 72 herein described, since it is within the scope of the invention to substitute for the same a single control means that may be preselectively set for operation at any one or a plurality of desired ranges of temperature.

From the diagram in FIG. 7 it will be noted that the two center dividing panel means 30b and 30c operate and are controlled by the same low and high range thermostatic control means 70 and 72. A signal light 74 may be provided to indicate the proper operation of the heating element 54 of panel 30a. A signal light 76 may indicate the proper operation of the heating elements 54 of both of the divider panels 30b and 30c jointly, while a signal light 78 serves to indicate the proper operation of heating element 54 of the panel 30d. The signal lights 74, 76 and 78 may be conveniently mounted on an accessible or visible portion of the galley 10 or oven 12.

The heat in each of the smaller compartments of the oven may be selectively controlled simultaneously either for low range temperature or for high range temperature, or the heat in each smaller compartment may be selectively and individually controlled variably either for low or high range temperature operation by the manipulation of switches 80, 82 and 84. If it is desired to retain the temperature in each of the divided smaller compartments equal and simultaneously, either within the high range or low range of temperature operation the switch elements 80, 82 and 84 may be linked or connected together for simultaneous operation by means of a common throw bar 86.

The switches 80, 82 and 84 serve to transmit current from a source of electrical energy by way of input lines 88, 90 and 92 to each of the low range thermostats 70 by circuit engagement with contacts 94, 96 and 98 or with the high range thermostats 72 by circuit engagement with contacts 100, 102 and 104. The connector 106 links the contact 94 with the low range thermostat 70 of the heating element 54 forming a part of the end panel 30a at the terminal board 108. The connector 110 links the contact 96 with the low range thermostat 70 of the two inner heating elements 54 of the divider panels 30b and 30c at the terminal part 112, while a connector 114 links the contact 98 with the low range thermostat 70 of the heating element 54 of the panel 30d at the terminal board 116.

When the switches 80, 82 and 84 are operated to close a circuit with their respective contacts 94, 96 and 98 to their low range thermostats 70 and to their respective heating elements 54 along input conductors 117, each of the smaller compartments of the oven will be subjected to the same low range of temperature at the same time. The heating elements 54 of each of the panels 30a, 30b, 30c and 30d will be operated simultaneously and their respective signal lights 74, 76 and 78 will indicate the proper operation of such elements by virtue of their connection with the input and output contacts 66 of their respective outlets 36. Each panel 30 is properly grounded at 118 while a resistor 120 placed in the line of each of the signal indicators 74, 76 and 78 prevents overloading of the same during rapid changes or surging of current.

The circuit through the heating element 54 of panel 30a is completed by a return line 122 terminating at 124 of the terminal board 108 and connected in series with a common return line 126 by conductors 128, contact 130 of the terminal board 112 and conductor 132. The heater element of panel 30b is connected in series with the common return line 126 by the conductors 136 and 132. Heating element 54 of panel 30c, having common series connection with the heating element 54 of panel 30b, is also connected with the common return line 124 by the conductors 138 and 132. Heater element 54 of panel 30d makes contact at 140 with its terminal board 116 by way of conductor 142 and is in series connection with the common return line 126.

Thus, it may be seen that a circuit closed to each of the low range thermostats 70 in each of the divided smaller compartments will control also the operation of each one of the four heating elements 54 of each one of the panels 30a, 30b, 30c and 30d to provide a common and equal low range of temperature in all of the smaller oven compartments at the same time. In a similar manner, the same heating element of each of the panels 30a, 30b, 30c and 30d may be controlled to provide a high range of temperature in each of the smaller compartments. This may be accomplished by actuating the throw bar 86 to operate the switches 80, 82 and 84 to close a circuit with their respective contacts 100, 102 and 104 simultaneously. Each of these contacts is respectively connected with the terminal boards 108, 112 and 116 by conductors 144, 146 and 148, to the high range thermostatic control means 72, and to the respective heating elements 54 by input conductors 117.

Each one of the high range thermostats 72 is in series, series-parallel relationship with the low range thermostatic control means 70 and is linked to its respective heating element and input line 117 at a contact 150 on each of the aforementioned terminal boards. When the switches 80, 82 and 84 are operated to close the circuits to the high range thermostats 72, heating elements 54 of the panels 30a, 30b, 30c and 30d are energized. Current passing to the heating elements is returned by common return line 126 through the series connected lines in the same manner previously described. At the same time, the signal light 74, 76 and 78 of each heater element is energized to provide an indication of the proper operation thereof.

Hence, it may be seen that the temperature in each one of the smaller divided and separated compartments of the oven may be maintained at either a low or high range. However, in the event it is desired to vary the ranges of temperature in each one of the smaller compartments individually, it is merely necessary to disconnect the switches 80, 82 and 84 from the common throw bar 86 for individual operation. This will permit the operation of the outermost panels 30a and 30d and their respective heating elements 54 separately and apart from the operation of the two innermost panels 30b and 30c and their heating elements 54. This ability to energize and selectively operate various thermostats and heating elements permits a wide range of temperature control in each one of the smaller oven compartments.

By locating the control means 70 and 72 in the lowermost portion of each one of the smaller compartments and in the area of the compartment whereat the lower part turns of the heating elements 54 produces their greatest concentration of heat, the temperature of such compartments will remain substantially even. When a temperature in the compartment rises or falls below the preselected and predetermined setting of the control means 70 or 72, such control means will either open or close the operating electrical circuit to its respective heating element 54. Thus, the thermostatic control means 70 and 72 controls the operation of its respective heating element to maintain its preselected range of temperature in its divided, smaller oven compartments.

Referring to FIGS. 1, 2 and 3 it will be noted that the panel means 30 is provided with a substantially U-shaped flange 151 secured about the bent marginal edge 48 of the plate 38. The flange 151 extends from a position short of the top of the panel 30 downwardly therealong to terminate in substantial horizontal alignment with the bent edge 50. The length of the flange 151 is substantially equal to the distance between the upper and lower tracks 28 and 34 to fit precisely between them when the panel 30 is fully within the oven. Each one of the doors 24, 26, etc. is provided with a bordering plastic or hollow elastic seal 152 that seats against the wide back of flange 151 when the door is closed over the oven compartment. The seals 152 extending about the edges of the doors will seat air-tightly against the flange 151 as well as the leading edge of the bottom wall 18. The cooperation of the elastic seal 152 thus insures complete air-tight enclosure of the compartment.

FIG. 5 diagrammatically depicts an oven 212, the details of which are substantially the same as the oven 12 of FIG. 1 viewed along a horizontal plane directly beneath the top wall 14. The interior compartment of oven 212 is adapted to be divided completely into separate and distinct smaller compartments by intermediate heating panels 230b and 230c while end panels 230a and 230d have the same structural details as panel 30 described above. Each divider panel 230b and 230c includes a pair of heating elements 54a and 54b, one each on opposite sides thereof. The heating elements 54a and 54b are wound in the same manner and have the same structural details as panel 30. However, each heating panel 230b and 230c includes an insulating member 254. The insulating member 254 is secured between and joined with the adjacent side heating elements 54a and 54b to define a unitary panel structure.

Heating element 54a of the left hand side of panel 230b is adapted to operate in conjunction with the heating element 54 of panel 230a to heat the divided compartment of which they define the side walls. Both heating elements 54b and 54a of panels 230b and 230c apply their heat to the small compartment between them, while heating elements 54b and 54 of panels 230c and 230d respectively heat the divided compartment therebetween. Since each of the heating elements have the same structural details as panels means 30 previously described, they are similarly adapted to be engaged with contacts 66 (FIG. 8) of outlets 36 secured in the rear wall 16 in the same manner as the panel 30.

When the panels are guidingly positioned fully in the oven as shown in FIG. 5, their heating elements become operative working parts of the electrical circuit generally identified by the numeral 268, as shown in FIG. 8. The operation of the heating elements along the opposite walls of the divided adjacent smaller compartments is controlled by the thermostatic members 70 positioned in each of the compartments at the portions thereof wherein there is the greatest concentration of heat. Each pair of control devices 70 and 72 now control the heating operation of a pair of the heating elements positioned along the opposite walls of the compartment.

Referring to FIG. 8, it will be noted that the signal light 74 indicates the proper operation of the heating elements 54 and 54a of the two wall panels 230a and 230b. Indicator 76 serves to signal the proper operation of heating elements 54b of panel 230b and 54a of panel 230c. The signal light 78 indicates the operation of heating elements 54b and 54 of panels 230c and 230d respectively. A resistor 120 is located in the lines of each of the aforementioned signal lights in the same manner as in the diagram of FIG. 7 to prevent overloading the filament of their respective lights.

The remainder of the electrical circuit 268 is substantially the same as that described with respect to circuit 68 (FIG. 7). Each pair of heating elements facing into the compartment of which they form the opposite walls, is connected together for simultaneous controlled operation by the thermostats 70 and 72 in the respective compartment. The control is performed in the same manner as described with respect to the heating elements 54 of panels 30b and 30c of FIG. 7. To more clearly corelate the operation of the circuit 268 (FIG. 8) with the operation of panels 30b and 30c of circuit 68 (FIG. 7) the return lines of each of the heating elements shown in circuit 268 have been numbered to coincide with the numerals of FIG. 7.

For example, the pair of heating elements 54 and 54a of panels 230a and 230b respectively, the pair of heating elements 54b and 54 of panels 230c and 230d respectively are connected with their respective low and high range thermostats 70 and 72 at common contacts 150 on their respective terminal boards 108, 112 and 116. The return lines 136 and 138 of each of the heating elements 54 and 54a of panels 230a and 230b respectively join at contact 124 on board 108. They are connected in series with the common return line 126 by connectors 128 and 132. The return line 136 of heating element 54b of panel 230b and line 138 of heating element 54a of panel 230c are joined at contact 130 on terminal board 112 and connected in series with the common return line 126 by a connector 132. The similarly numbered return lines 136 and 138 of heating elements 54b and 54 of panels 230c and 230d respectively are joined at contact 140 with the common return line 126.

From what has been described it will be recognized that each one of the divided smaller compartments may have its heat controlled separately from that of the next adjacent compartment. This may be accomplished by disengaging the common throw bar 86 from across the switch elements 80, 82 and 84 to permit individual selective operation of the same. Thus, any one of the thermostatic control devices 70 or 72 in the small compartments may be selectively chosen for operation to predeterminately regulate the temperature in its respective compartment by the individual selective switching of elements 80, 82 and 84.

As described with respect to circuit 68, any selected one or all of the low range thermostats 70 may be operated by engaging the switch elements 80, 82 and 84 with their respective contacts 94, 96 and 98. Selective operation of any one or all of the high range thermostats 72 is accomplished by engaging the switch elements 80, 82 and 84 with its respective contacts 100, 102 and 104. If uniform low or high range temperature control is desired throughout all of the divided compartments simultaneously, the throw board 86 may be secured across the elements 80, 82 and 84 to link them together for simultaneous switching operation.

FIG. 6, shows an oven 312 in which there are included panels 330a, 330b, 330c and 330d operative in the same manner and adapted to form a working part of the same electrical circuit 268 as the panels 230a, 230b, 230c and 230d described above. Except, the oven in FIG. 6 differs from that in FIG. 5 in the construction of the divider panels 330b and 330c in that the same are composed of mirror-hand separable panel sections each of which includes a heating element and an insulating member. For example, panels 330b and 330c each comprise heating elements 54a and 54b of the same structural details as the heating element 54 of panel 30 previously described. Secured to the back of the heating element 54a of the panels 330b and 330c is an insulating member 354a, while a similar insulating member 354b is secured to the heating element 54b.

The heating element 54a and its insulator 354a are made integral with each other as are the heating elements 54b and their insulators 354b. Both the a and b heating and insulator mirror-hand sections combine to form the heating panels 330b and 330c. The heating elements of each of the panels are adapted to operate in the circuit 268 (FIG. 8) in the same manner as the corresponding heating elements of panels 230b and 230c of FIG. 5. However, the panels 330b and 330c permit removal of a half section thereof, including a heating element and insulator, without affecting the operation of the remaining half section comprising a heating element and insulator. The remaining half section of the panel may remain in and continue to completely divide the overall interior oven compartment into smaller compartments, heating such smaller compartments in accordance with the selective switching operations of the elements 80, 82 and 84.

The insulating members 254 of FIG. 5 and insulating members 354a and 354b of the panels in FIG. 6 prevent the movement of heat from one divided compartment to the other, thereby insuring a more even and complete control of temperature in the heated compartment.

While there have been shown and described and pointed out the fundamental novel features of the invention as applied to several preferred embodiments thereof, it will be understood that various omissions and substitutions and changes in the form and details of the devices illustrated and in their operations may be made by those skilled in the art, without departing from the spirit of the invention. It is the intention, therefore, to be limited only as indicated by the scope of the claims appended hereto.

We claim:

1. An oven comprising an operable electrical circuit, an interior oven compartment, vertically disposed panel means movable into and out of said oven compartment to completely separate the same into a plurality of adjacent compartments, said panel means including heating means positioned in the lower half thereof and operable initially to heat the lower half of said adjacent compartments and create convection currents therein in response to the operation of said electrical circuit, said circuit including selectively operable thermostatic control means in each of said separate compartments to control the operation of said heating means to maintain predetermined ranges of temperature in said respective separate compartments and further selectively operable thermostatic control means in each of said separate compartments to control the operation of said heating means to maintain different predetermined ranges of temperature in said respective separate compartments, each of said thermostatic controlled means being positioned in said separate compartments at the lowermost portions thereof whereat the greatest heat is applied, and switch means to operate said electrical circuit and to selectively operate said thermostatic control means in each of said separate compartments.

2. An oven comprising an interior compartment adapted to be divided into a plurality of separate compartments, vertically disposed panel means movable into and out of said interior compartment to completely divide the same into said plurality of separate oven compartments, said panel means including wound electrical heating means predeterminately positioned therein at the lower half thereof to apply its greatest amount of heat initially at the lower half portion of said separate compartments and create convection currents therein, an electrical circuit in said oven including means in the lowermost half of each of said compartments to selectively and controllably operate each of said heating means to maintain predetermined ranges of temperature in said separate compartments, and means on said panel means and included in said circuit to connect said electrical heating means with said electrical circuit when said interior compartment is divided into said plurality of separate compartments.

3. An oven comprising an interior compartment, an operable electrical circuit in said oven, vertically arranged panel means movable into and out of said interior compartment to separate the same into a plurality of smaller adjacent compartments, said panel means having heating means operable to heat said adjacent compartments, said heating means comprising a heating element having a plurality of longitudinally closed spaced turns in the lower part of the lower half portion of said panel means and a plurality of turns in the upper part of said lower half portion spaced longitudinally wider than said lower part turns, means on said panel means and included in said circuit to operably connect said heating means with said circuit when said panel means is moved to separate said interior compartment, said heating means being predeterminately positioned in said panel means to apply its greatest heat to the lowermost portion of said adjacent compartments, and thermostatic means positioned in the portion of said compartments at which said greatest heat is applied thereto and included in said circuit to control the operation of said heating means.

4. An oven as in claim 3, said panel means comprising insulating means, and one of said heating means being positioned on either side of said insulating means.

5. An oven as in claim 3, said panel means comprising insulating means, and said heating means being positioned along a side thereof.

6. A heating panel having an interior space, a heating element in the lower half portion of said space and said space being free of said heating element in the upper half portion thereof, said heating element having a plurality of longitudinally closer spaced turns in the lower part of said lower half portion and a plurality of turns in the upper part of said lower half portion spaced longitudinally wider than said lower part turns whereby the heat produced by said heating element will be greater at said lower part than at said upper part, and contact means on said panel at which the ends of said heating element are connected for engagement with a source of electricity.

7. A heating panel for an electric oven comprising spaced front and back plates secured together to define an interior heating element space, a heating element in said space, said element being wound in turns for the width of said space and for less than half the height of said space leaving the upper half of said space free of said heating element, an upper part of said turns being spaced longitudinally from each other twice the distance of the spacing of the turns of the lower part, and contact means on said panel at which the ends of said heating element are connected for engagement for a source of electricity.

8. A heating panel as in claim 7, spacer means between said turns of said upper part to retain said turns in their relatively spaced position.

9. An electric oven comprising an interior compartment, vertically arranged panel means completely dividing said interior compartment into a plurality of adjacent smaller compartments, heating means along the divided sides of said adjacent compartments, said heating means being a heating wire having its greatest number of turns at the lowermost part of said panel and extending upward along said panel for less than half the height thereof and free of the upper half of said panel to apply its greatest heat to the lowermost portion of said adjacent compartments, an electrical circuit for operating said heating means, and thermostatic means included in said electrical circuit and positioned in the lower portion of said compartments whereat the greatest heat of said heating means is applied to control the operation of said heating means.

10. An electric oven as in claim 8, said switch means including a plurality of switch elements each operable to selectively operate said temperature range control means individually to provide different predetermined ranges of temperature in each of said smaller compartments.

References Cited in the file of this patent

UNITED STATES PATENTS

| Re. 14,286 | Mann | Apr. 17, 1917 |
| 2,625,928 | Gould | Jan. 20, 1953 |
| 2,668,221 | McCormick | Feb. 2, 1954 |
| 2,758,193 | Mantofel | Aug. 7, 1956 |
| 2,790,886 | Fry | Apr. 30, 1957 |
| 2,885,526 | Paulding | May 5, 1959 |

FOREIGN PATENTS

| 505,220 | Great Britain | May 8, 1939 |
| 591,466 | Great Britain | Aug. 19, 1947 |